United States Patent [19]
Ohzeki et al.

[11] Patent Number: 5,639,367
[45] Date of Patent: Jun. 17, 1997

[54] FUEL FILTER DISPOSED IN A FUEL TANK FOR AUTOMOBILES

[75] Inventors: Toshihide Ohzeki, Sashima-gun; Yoshio Ebihara, Kariya; Hisashi Takayanagi, Chita-gun, all of Japan

[73] Assignees: Kyosan Denki Co., Ltd., Tokyo; Nippondenso Co., Ltd., Kariya, both of Japan

[21] Appl. No.: 576,832

[22] Filed: Dec. 21, 1995

Related U.S. Application Data

[63] Continuation of Ser. No. 247,390, May 23, 1994, abandoned.

[30] Foreign Application Priority Data

Jun. 24, 1993 [JP] Japan .................................. 5-175847
Sep. 6, 1993 [JP] Japan .................................. 5-243544

[51] Int. Cl.$^6$ .............................. B01D 35/02; B01D 29/19
[52] U.S. Cl. ..................... 210/315; 210/317; 210/461; 210/486; 210/498; 210/499
[58] Field of Search ..................... 210/172, 416.4, 210/459, 460, 463, 486, 489, 499, 461, 462, 317, 315

[56] References Cited

U.S. PATENT DOCUMENTS

| | | | |
|---|---|---|---|
| 5,049,271 | 9/1991 | Cain | 210/486 |
| 5,055,187 | 10/1991 | Ito et al. | 210/461 |
| 5,395,520 | 3/1995 | Ito et al. | 210/172 |

FOREIGN PATENT DOCUMENTS

| | | | |
|---|---|---|---|
| 4026230 | 10/1991 | Germany | 210/172 |
| 2253160 | 9/1992 | United Kingdom . | |

*Primary Examiner*—Matthew O. Savage
*Attorney, Agent, or Firm*—Flynn, Thiel, Boutell & Tanis, P.C.

[57] ABSTRACT

In a fuel filter disposed in a fuel tank for automobiles, a filter cloth is prevented from being damaged or broken so as to maintain the filtering property stably for a long period of time. The fuel filter disposed in a fuel tank for automobiles has a frame body for swelling the filter cloth wherein outer surfaces of the frame body arc gently at the portion where the frame body contacts the filter cloth, whereby the filter cloth is prevented from being damaged or broken even if the filter cloth repeatedly contacts the frame body.

25 Claims, 5 Drawing Sheets

FIG. I
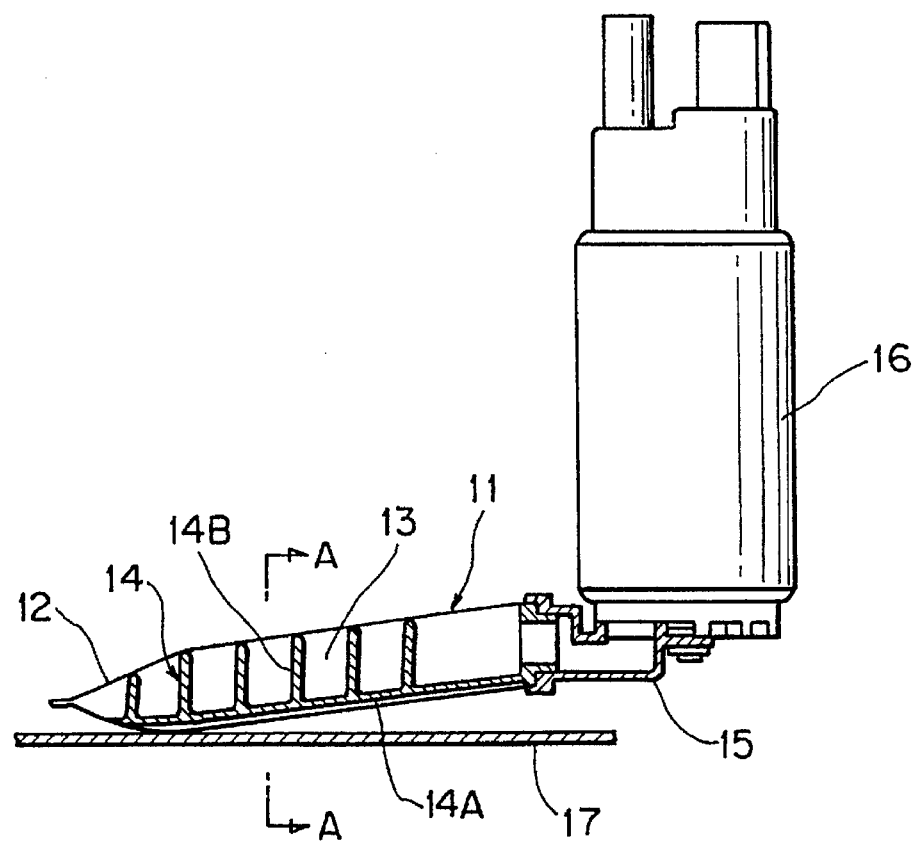
FIG. 2
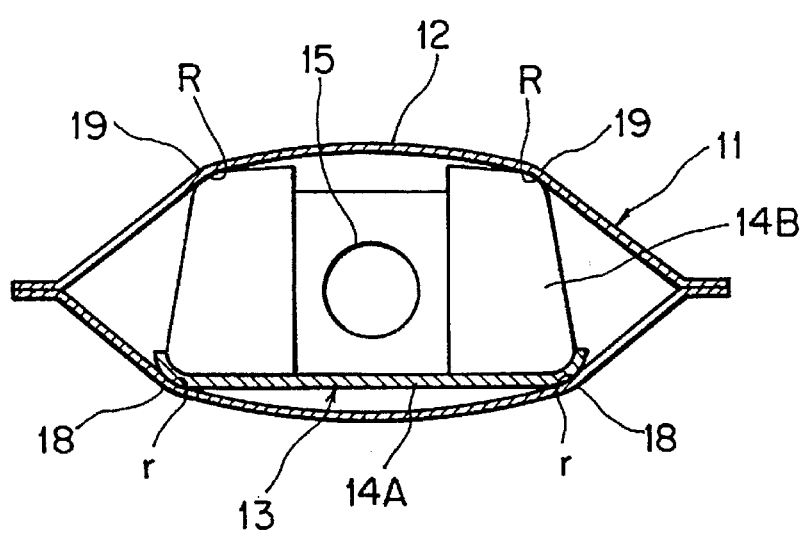

5,639,367

FUEL FILTER DISPOSED IN A FUEL TANK FOR AUTOMOBILES

This application is a continuation of U.S. Ser. No. 08/247,390, filed May 23, 1994, now abandoned.

BACKGROUND OF THE INVENTION

1. Technical Field

The present invention relates to an improvement of a fuel filter disposed in a fuel tank for automobiles in such a way as to be soaked in fuel, more particularly to a fuel filter capable of preventing a filter cloth from being damaged.

2. Prior Art

There are various kinds of fuel filters for catching foreign matters in fuel, of which the fuel filter disposed in a fuel tank in such a way as to be soaked in fuel is known.

A known fuel filter disposed in a fuel tank will be described with reference to FIGS. 9 and 10.

The known fuel filter 1 disposed in a fuel tank comprises a bag-shaped filter cloth 2, a frame body 4 for supporting the filter cloth 2 so as to partition the filter cloth 2 to form inner spaces 3 therein and an outlet pipe portion 5 for discharging fuel. The outlet pipe portion 5 is connected to a suction port of a fuel pump 6 through which fuel is supplied to a carburetor or a fuel injection unit, not shown. The fuel filter 1 and the fuel pump 6 are disposed in the fuel tank 7 at the portion adjacent to a bottom of the fuel tank 7.

The frame body 4 employed by the fuel filter 1 must have the following functions.

Since the fuel filter 1 catches foreign matters in the fuel passing through the filter cloth 2, it must have inner spaces 3 for containing fuel therein. Accordingly, the frame body 4 must have a shape adapted for contacting the filter cloth 2 and swelling the filter cloth 2 so as to form the inner spaces 3 therein.

Since the known fuel filter I disposed in the fuel tank 7 for automobiles must suck all the fuel from the fuel tank 7 (although a small amount of fuel is residual in the bottom thereof), it must be disposed in the fuel tank 7 so as to contact the inner bottom wall thereof.

To carry out the aforementioned functions, the known frame body 4 comprises a bottom wall member 4A disposed in contact with the inner bottom wall of the fuel tank 7 and a plurality of rising wall members 4B which project from both ends of the bottom wall member 4A so as to suck all the fuel in the fuel tank 7 and partition the filter cloth 2 to form inner spaces 3.

However, this known fuel filter 1 has the following drawbacks.

Since the frame body 4 is bent at corners 8 provided at the rear surface of the bottom wall member 4A which contact the filter cloth 2 with a given angle, namely, the corners 8 of the frame body 4 are pointed, the filter cloth 2 swings when the fuel swings in the fuel tank 7 so that the filter cloth 2 is liable to be broken by the corners 8. That is, since the corners 8 provided at the rear surface of the bottom wall member 4A are pointed at the portion contacting the filter cloth 2, the filter cloth 2 is liable to be broken when the filter cloth 2 is swung and repeatedly pressed against the corners 8.

Furthermore, since corners 9 which are provided at the bottom wall member 4B and contact the filter cloth 2 are also pointed, the filter cloth 2 are likely to be damaged when the filter cloth 2 is repeatedly pressed against the corners 9.

Still furthermore, since the frame body 4 is formed of a rigid body, it is not flexible, the contact pressure between the filter cloth 2 and the corners 8 is increased when the filter cloth 2 contacts the corners 8, which aggravates the damage of the filter cloth 2.

Still more further, since the rising wall members 4B are square, the wall members 4B contacting the filter cloth 2 have small contact areas so that the filter cloth 2 is liable to become deflated by this contact areas since gaps are defined between the wall members 4B and the filter cloth 2.

SUMMARY OF THE INVENTION

It is therefore an object of the invention to improve the drawbacks of the known fuel filter disposed in a fuel tank and to provide a fuel filter disposed in a fuel tank for automobiles which can prevent the damage of the filter cloth and maintain a filtering property stably for a long period of time.

To achieve the above object, the fuel filter of the present invention is featured in a frame body which arcs at the portion where it contacts the filter cloth. With such a featured arrangement, the filter cloth is neither damaged nor broken even if it repeatedly contacts the frame body under pressure.

BRIEF DESCRIPTION OF THE DRAWINGS

FIG. 1 is a cross-sectional view of a fuel filter disposed in a fuel tank for automobiles according to a first embodiment of the invention;

FIG. 2 is a cross-sectional view of the fuel filter of FIG. 1;

DESCRIPTION OF THE PREFERRED EMBODIMENTS

First Embodiment (FIGS. 1 and 2)

Figure 3:
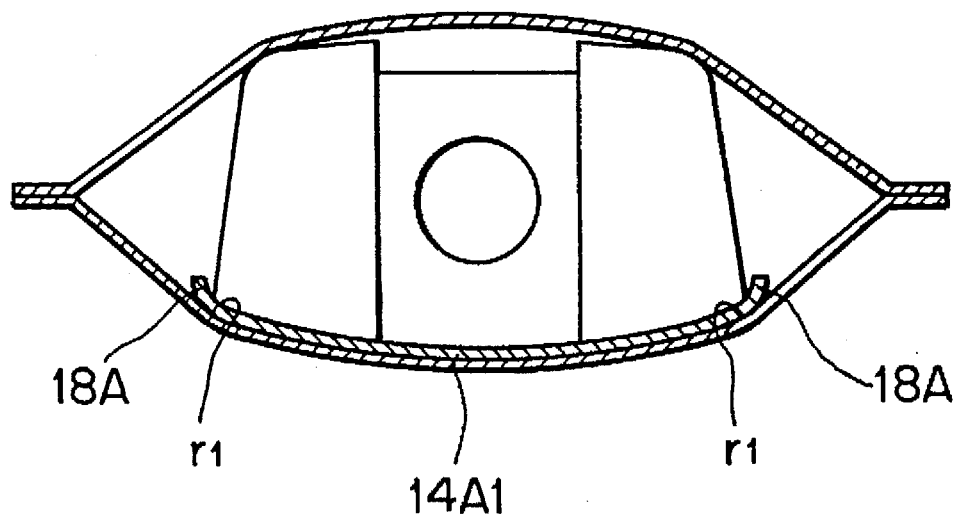
FIG. 3 is a cross-sectional view of a fuel filter disposed in a fuel tank for automobiles according to a second embodiment of the invention.

A fuel filter disposed in a fuel tank for automobiles according to a first embodiment of the invention comprises the known fuel filter 11 disposed in a fuel tank comprises a bag-shaped filter cloth 12, a frame body 14 for supporting the filter cloth 12 so as to partition the filter cloth 12 to form inner spaces 13 therein and an outlet pipe portion 15 for discharging fuel. The outlet pipe portion 15 is connected to a suction port of a fuel pump 16 through which fuel is supplied to a carburetor or a fuel injection unit, not shown. The fuel filter 11 and the fuel pump 16 are disposed in the fuel tank 17 at the portion adjacent to a bottom of the fuel tank 17.

Figure 9:
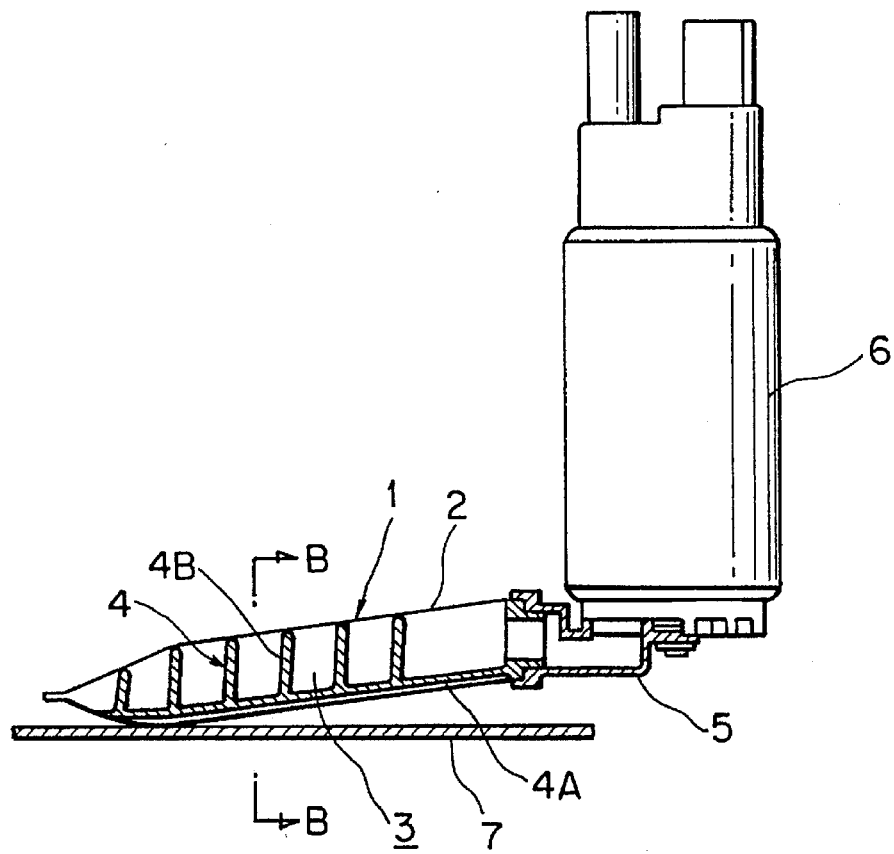
FIG. 9 is a cross-sectional view of a prior art fuel filter disposed in a fuel tank for automobiles.
Figure 10:
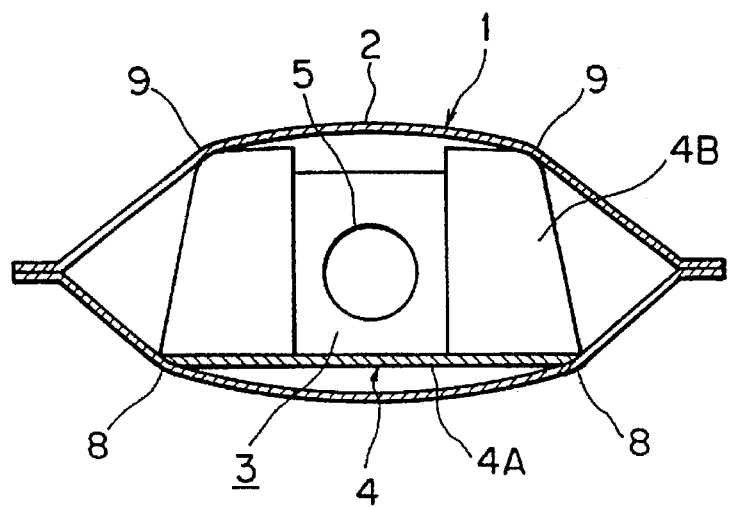
FIG. 10 is a cross-sectional view taken along B—B of FIG. 9.

The frame body 14 comprises a bottom wall member 14A and a plurality of rising wall members 14B projecting from the bottom wall member 14A for keeping the filter cloth 12 open and for increasing the strength of the filter cloth 12. The structure of the fuel filter 11 is substantially the same as that of the prior art structure as illustrated in FIGS. 9 and 10, frame body 14 is, however, different from frame body 4 in respect of the arrangement of the bottom wall member 14A and the rising wall members 14B.

That is, the bottom wall member 14A has rising portions 18 integrated therewith at both ends thereof at the portion where the bottom wall member 14A contacts the filter cloth 12. The rising portions 18 arc gently at the outer surfaces thereof as denoted at r. Even if there are not provided the rising portions 18 at both ends of the bottom wall member 14A, the bottom wall member 14A is shaped to have arcs r at the outer surfaces of both ends thereof. There are also formed arcs R at the outer surfaces of the portions 19 where the rising wall members 14B contact the filter cloth 12.

Since the fuel filter 11 disposed in a fuel tank for automobiles according to the first embodiment arc gently as denoted at r and R at the portions 18 and 19 where the frame body 14 contacts the filter cloth 12, even if the filter cloth 12 repeatedly contacts the frame body 14, the filter cloth 12 is prevented from being broken or damaged.

Second Embodiment (FIG. 3)

In the second embodiment, a bottom wall member 14A1 substantially forms as arcing bilge-shape as a whole.

The arcing bilge-shaped bottom wall member 14A1 is bent at both ends thereof to form bent portions 18A which arc gently at the outer surfaces thereof as denoted at r1. As a result, even if the filter cloth 12 repeatedly contacts the outer surfaces of the bent portions 18A, the filter cloth 12 is prevented from being damaged or broken because of the gentle arcs r1 of the outer surfaces of the bent portions 18A.

Figure 4:
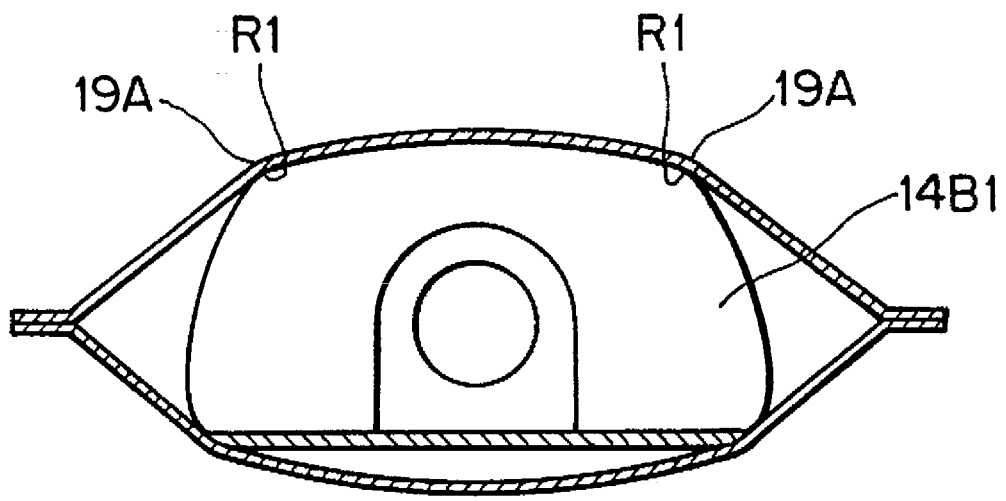
FIG. 4 is a cross-sectional view of a fuel filter disposed in a fuel tank for automobiles according to a third embodiment of the invention.

Third Embodiment (FIG. 4)

The fuel filter disposed in a fuel tank for automobiles has rising wall members 14B1 each formed of an inverse U-shaped plate member. An outer surface of the inverse U-shaped plate member, i.e., rising wall member arcs gently as denoted at R1.

Fourth Embodiment (FIGS. 5 to 8)

Figure 5:
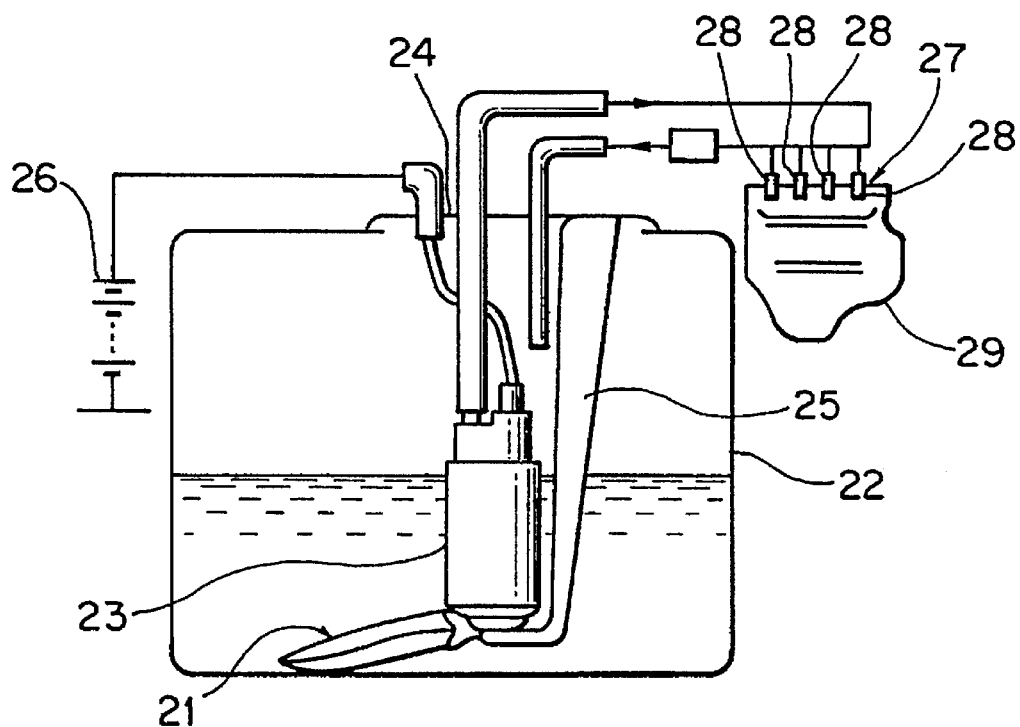
FIG. 5 is a cross-sectional view of a fuel filter disposed in a fuel tank for automobiles according to a fourth embodiment of the invention, wherein the relation between the fuel filter and other elements is shown.

In FIG. 5, a fuel filter 21 is disposed in a fuel tank 22 for automobiles in such a way as to be soaked in fuel and it is attached to a suction port of a fuel pump 23 which is also disposed in the fuel tank 22. The fuel pump 23 is attached to a cover 24 of the fuel tank 22 by way of a stay 25 and it is actuated by a battery 26 mounted on the automobile for drawing fuel into the fuel tank 22 and supplying the fuel to an injector 28 of a fuel injection unit 27. The fuel supplied to the injector 28 is jetted and supplied from the injector 28 toward an engine 29.

Figure 6:
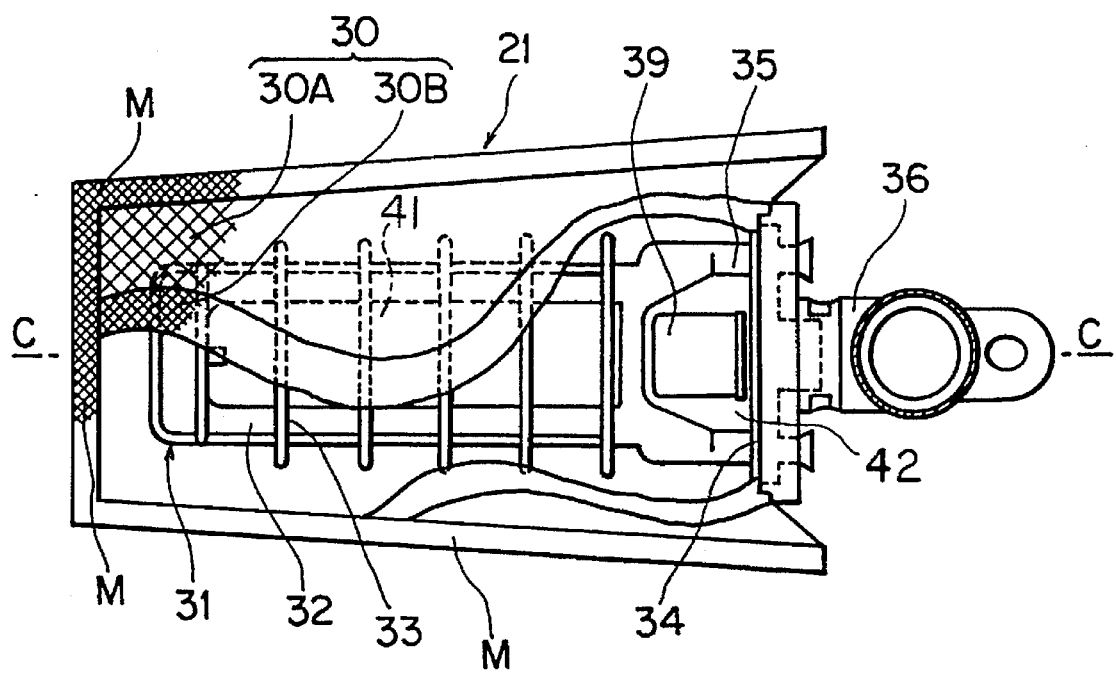
FIG. 6 is a plan view of the fuel filter of FIG. 5 wherein a part of the fuel filter is broken.
Figure 7:
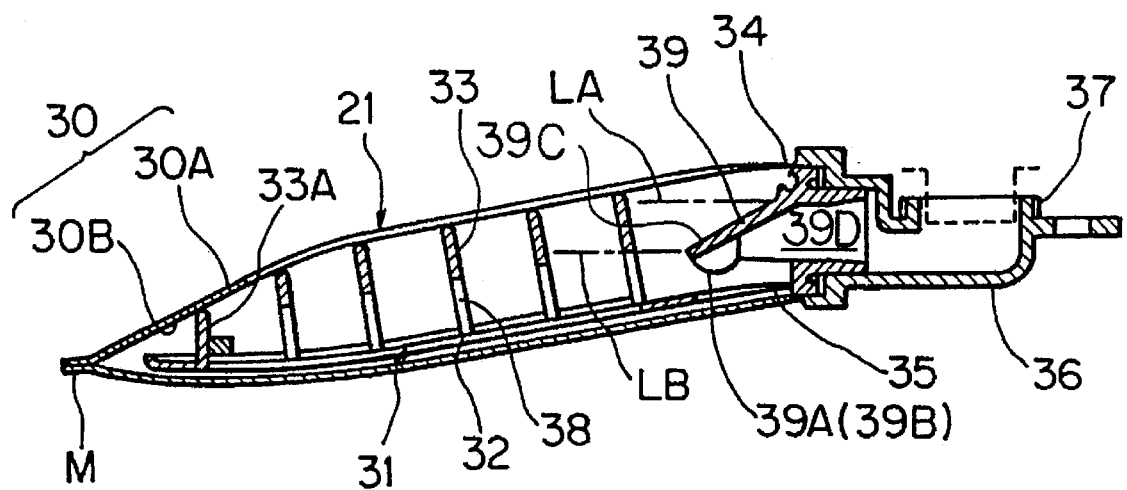
FIG. 7 is a cross-sectional view taken along C—C of FIG. 7.
Figure 8:
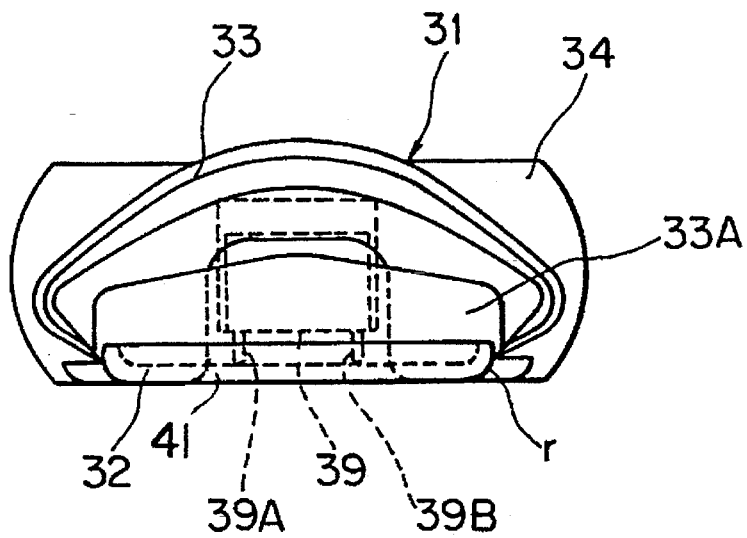
FIG. 8 is a side view of a frame body as illustrated in FIGS. 6 and 7.

A structure of the fuel filter 21 disposed in a fuel tank for automobiles will be described with reference to FIGS. 6 to 8.

The fuel filter 21 comprises a filter cloth 30, a frame body 31 and an outlet pipe portion 36. The filter cloth 30 is double structured, namely, it comprises an inner filter cloth 30B and an outer filter cloth 30A which lies on the inner filter cloth 30B. The filter cloth 30 is folded in two sections and three sides of the folded folder 30 are welded as at M to form a bag. The outer filter cloth 30A comprises a filter member of tatami-facing-like weave composed of vertical filaments or yarns each having a diameter of 0.25 mm and lateral filaments or yarns each having a diameter of 0.1 min. The inner filter cloth 30B comprises a filter member of plain weave composed of vertical and lateral filaments or yarns respectively having diameters of 0.043 min.

The frame body 31 is formed of synthetic resins and comprises an elongated bilge-shaped bottom wall member 32, a plurality of rising wall members, rib plates, 33 projecting from the bottom wall plate member 32, a connecting pipe portion 34 formed at one end thereof and two elastic thin connecting portions 35 which elastically and deformably connect the bottom wall plate member 32 to the connecting pipe portion 34. The lateral side ends of the bottom wall plate member 32 arc gently at the outer surfaces thereof as denoted at r where it contacts the filter cloth 30. As seen best by FIG. 6, bottom wall plate member 32 is formed to define a first, elongated opening 41 located in approximately the center of the member 32 and a second connecting pipe opening 42 located adjacent the connecting pipe 34 between the connecting portions 35.

The outlet pipe portion 36 is formed of synthetic resins and has an upwardly rising cylindrical portion where a metallic collar 37 is provided.

The frame body 31 is disposed in the filter cloth 30. A pipe portion and fixed two projections respectively extending from the collar-shaped connecting pipe portion 34 are provided to penetrate a non-welded one side of the filter cloth 30. The outlet pipe portion 36 is pressed into the pipe portion and fixed projections of the connecting pipe portion 34 from the outside of the filter cloth 30. When the outlet pipe portion 36 is fitted over and connected to the connecting pipe portion 34, the filter cloth 30 is clamped and fixed between the outlet pipe portion 36 and the connecting pipe portion 34.

The rising wall members 33 are arch-shaped so as to define center spaces 38 that extend upwardly from the wall plate member center opening 41. The width of the rising wall members 33 is greater than that of the bottom wall plate member 32, namely, the former extends outside from the latter. Outer peripheral surfaces of the rising wall members 33 are smoothly curved as a whole. The rising wall members 33 are gradually decreased in their heights from the connecting pipe portion 34 toward the tip end of the fuel filter 21. The outer peripheral surfaces of the rising wall members 33 contact the filter cloth 30 so as to hold the bag formed from the filter cloth 30 open. The rising wall members 33 have diamond-shaped corners which are rounded. The notches or center spaces 38 which are defined at the central lower portions of the rising wall members 33 extend upwardly from the center opening 41 of the bottom plate and define a passage extending in the longitudinal direction of the filter cloth 30 for assuring the smooth flow of the fuel when the fuel is drawn by the fuel pump 23.

An inverted trough-shaped member 39 is formed in the connecting pipe portion 34 so as to extend inside the filter cloth 30. As seen best by FIG. 6, bill shaped portion 39 subtends the area subtended by bottom wall plate member connecting pipe opening 42. The member 39 has a generally flat, cross-sectional profile and has an upper wall 39C that extends diagonally downward and two side walls 39D (one shown) that extend downwardly from the edges of the upper wall 39C whereby the open end of the connecting pipe portion 34 through which fuel flows out of the bag is located at a lower position (LB). Provided that the bill-shaped portion 39 is not provided on the connecting pipe portion 34, the fuel sucking end is located at a high position (LA) which is higher than the low position (LB). Semicircular portions 39A and 39B are formed at both side surfaces of the trough-shaped member 39 at the tip end thereof and they are curved so as to extend below the side walls 39D with which they are integral. With such an arrangement, when the fuel filter 21 is largely deformed at the upper side thereof, the filter cloth 30 is prevented from being damaged by the bill-shaped portion 39 even when the bill-shaped portion 39 contacts the filter cloth 30. In other words, if the semicircular portions 39A and 39B are not formed on the bill-shaped portion 39, the bill-shaped portion 39 damages the filter cloth 30. The two elastic connecting portions 35 are formed between the bottom wall plate member 32 and the connecting pipe portion 34 and have thickness which is less than the other portions, whereby the bottom wall plate member 32 can be vertically deformed with sufficient flexibility.

The rising wall member 33A which is positioned at the uppermost front portion of the rising wall members 33 is substantially rectangular and has a smoothed crowed outer periphery and it supports the filter cloth 30 from the inside thereof at the tip end of the filter cloth 30 for holding the bag from the filter cloth 30 open.

According to the fuel filter disposed in a fuel tank for automobiles of this embodiment, the strength of the frame body 31 is increased and the filter cloth 30 maintains a cubic baggy shape against the negative pressure generated when the fuel pump 23 draws fuel (hereinafter referred as simply a negative pressure). Particularly, even when the filter cloth 30 is clogged with foreign materials for thereby increasing the negative pressure, the filter cloth 30 holds its initial shape so that the property for sucking the fuel is restrained from being deteriorated. Furthermore, even if the filter cloth 30 is double structured and the inner filter cloth 30B comprises the filter member having small diameter, the filter cloth 30 can be surely prevented from being damaged since the frame body 31 has a smooth curved surface.

The fuel filter disposed in a fuel tank for automobiles of the present invention can maintain the filtering property stably for a long period of time since the filter cloth is neither damaged nor broken even if the filter cloth repeatedly contacts the frame body.

What is claimed is:

1. A fuel filter for use in a vehicle fuel tank, the vehicle fuel tank having a fuel suction inlet therein, said fuel filter including:

a filter bag formed from a filter mesh material, said filter bag having a top side and a bottom side opposed to said bottom side;

a connecting assembly partially disposed in said filter bag, said connecting assembly having an outlet pipe with an outlet in fluid communication with the fuel tank fuel suction inlet and a connecting pipe having a first end coupled to said outlet pipe and having a second end defining an opening disposed in said filter bag that is in fluid communication with said outlet of said outlet pipe; and a frame connected to said connecting assembly and disposed in said filter bag, said frame including: an elongated bottom plate having a pair of opposite ends and means for attaching one of said opposite ends of said bottom plate to said second end of said connecting pipe, said bottom plate having two bottom plate portions that are spaced apart from each other so as to define an elongated center opening therebetween; and a plurality of rib plates that extend upwardly between said spaced apart bottom plate portions, each said rib plate being connected to both said bottom plate portions of said frame and extending across said center opening of said bottom plate and being shaped to define a notch that extends upwardly from said center opening of said bottom plate, whereby said notches formed in said rib plates allow fluid communication through said rib plates.

2. The fuel filter of claim 1, wherein: said filter bag has a rectangular profile so as to have opposed ends and elongated sides located therebetween; said connecting assembly is attached to one end of said filter bag; said bottom plate of said frame extends longitudinally through said filter bag; and said rib plates of said frame extend laterally across said filter bag.

3. The fuel filter of claim 2, wherein said bottom plate portions of said frame are connected by a member that extends between said bottom plate portions.

4. The fuel filter assembly of claim 3, wherein said bottom plate portions of said frame are pivotally attached to said connecting pipe.

5. The fuel filter assembly of claim 1 wherein said bottom plate portions of said frame are pivotally attached to said connecting pipe.

6. The fuel filter according to claim 5, wherein said filter mesh is formed of an inner cloth and an outer cloth that overlies said inner cloth, and wherein said inner cloth is formed of filaments having a diameter less than the diameter of filaments forming said outer cloth.

7. The fuel filter of claim 1, wherein said bottom plate portions of said frame are formed with elongated sides that have upwardly curving outer end surfaces.

8. The fuel filter according to claim 1, wherein said filter mesh is formed of an inner cloth and an outer cloth that overlies said inner cloth, and wherein said inner cloth is formed of filaments having a diameter less than the diameter of filaments forming said outer cloth.

9. The fuel filter of claim 1, wherein at least two said rib plates are designed to project outwardly and upwardly from said bottom plate and are formed to have at least partially rounded profiles.

10. The fuel filter of claim 1, wherein said bottom plate portions of said bottom plate extend between said opposite ends of said bottom plate so that said elongated center opening defined in said bottom plate extends between said opposite ends of said bottom plate.

11. A fuel filter adapted to be positioned in a vehicle fuel tank, said fuel filter including:

a filter bag formed of cloth, said filter bag having opposed upper and lower sides and an open end, wherein said lower side is adapted to be placed along the bottom of the fuel tank;

a frame body having a longitudinal axis and disposed in said filter bag for holding said filter bag open, said frame body being formed of a synthetic resin and shaped to have a bottom wall positioned to be disposed adjacent to said lower side of said filter bag, said bottom wall being formed with longitudinally extending edge portions shaped to have upwardly curved profiles, and a plurality of spaced apart rising walls that extend upwardly from said bottom wall toward the upper side of said filter bag and that extend laterally across said bottom wall;

a connecting pipe having a longitudinal axis and being attached to said frame body adjacent said open end of said filter bag, said connecting pipe being attached to said bottom wall of said frame body by an elastomeric member so as to be flexibly secured to said frame body, said connecting pipe being shaped to define a pipe opening located above said bottom wall of said frame body through which fuel is withdrawn and further having an inverted trough-shaped member attached to said connecting pipe that extends into said filter bag, wherein said trough-shaped member includes an upper wall with lateral edges that is attached to said connecting pipe at a location above said pipe opening, wherein said upper wall slants downwardly from said connecting pipe into said filter bag and terminates at a tip end, and wherein said trough-shaped member includes a pair of laterally spaced side walls that extend downwardly from said lateral edges of said upper wall, wherein said side walls are attached to said connecting pipe on lateral sides of said pipe opening and terminate at said tip end of said upper wall, wherein said trough-shaped member includes a pair of generally planar tabs, each said tab integrally formed with one of said side walls and located adjacent said tip end of said upper wall and each said tab is shaped to define a semi-circular profile and positioned so as extend downwardly from said side wall with which said tab is formed so as to prevent damage of said lower side of said filter cloth during contact between said lower side of said filter cloth and said trough-shaped member.

12. The fuel filter of claim 11, wherein said frame body bottom wall is shaped to have a substantially planar bottom surface between said upwardly curved edge portions thereof.

13. The fuel filter of claim 11, wherein said frame body rising walls are shaped to have corner sections with arcuate profiles.

14. The fuel filter of claim 11, wherein said frame body rising walls are shaped to have widths along the center sections thereof that are greater than the widths of the portions of said rising walls that are attached to said bottom wall of said frame body and said rising walls are further formed to have arcuately curved profiles.

15. The fuel filter of claim 14, wherein said bottom wall of said frame body has a selected thickness and said connecting pipe is deformably secured to said frame bottom wall by at least one elastic member having a thickness less than the thickness of said frame body bottom wall.

16. The fuel filter of claim 11, wherein said filter bag is formed from a first, inner cloth formed of vertical and lateral yarns woven in a plain weave, wherein vertical and lateral yarns of said inner cloth have a diameter of 0.043 mm, and a second, outer cloth disposed over said inner cloth formed of yarns woven in a tatami weave, wherein vertical and lateral yarns said outer cloth have a diameter 0.25 and 0.1 mm, respectively.

17. The fuel filter of claim 11, wherein an outlet pipe is disposed over said connecting pipe and said open end of said filter bag is secured between said connecting pipe and said outlet pipe.

18. The fuel filter of claim 11, wherein said bottom wall of said frame body has a selected thickness and said connecting pipe is deformably secured to said frame bottom wall by at least one elastic member having a thickness less than the thickness of said frame body bottom wall.

19. A fuel filter for use in a vehicle fuel tank, the vehicle fuel tank having a fuel suction inlet therein, said fuel filter including:

a filter bag formed from a filter mesh material, said filter bag having a top side and a bottom side opposed to said bottom side;

a connecting assembly partially disposed in said filter bag, said connecting assembly having an outlet pipe with an outlet in fluid communication with the fuel tank fuel suction inlet and a connecting pipe coupled to said outlet pipe and having an opening disposed in said filter bag that is in fluid communication with said outlet of said outlet pipe; and a frame connected to said connecting assembly and disposed in said filter bag, said frame including: an elongated bottom plate attached at one end of said connecting assembly, said bottom plate having two bottom plate portions that are spaced apart from each other so as to define an elongated center opening therebetween; and a plurality of rib plates that extend upwardly between said spaced apart bottom plate portions, said rib plates being connected to both said bottom plate portions forming said bottom plate and extending across said center opening of said bottom plate and being shaped to have bottom side edges that extend diagonally outwardly and upwardly away from said bottom plate portions and top side edges that extend diagonally inwardly from said bottom side edges so that said top edges meet, wherein said rib plates are formed with rounded corners at locations where said bottom side edges and said top edges meet and at locations where said top side edges meet each other and said rib plates are further formed to define notches that extend upwardly from said center opening of said bottom plate.

20. The fuel filter according to claim 19, wherein said filter mesh is formed of an inner cloth and an outer cloth that overlies said inner cloth, and wherein said inner cloth is formed of filaments having a diameter less than the diameter of filaments forming said outer cloth.

21. The fuel filter according to claim 19, wherein said filter bag has opposed ends and elongated longitudinal sides that extend between said opposed end and said filter cloth is formed out of filter mesh material that is welding along opposed longitudinal sides and at one end so as to form said filter bag.

22. A fuel filter for use in a vehicle fuel tank, the vehicle fuel tank having a fuel suction inlet therein, said fuel filter including:

a filter bag formed from a filter mesh material, said filter bag having a top side and a bottom side opposed to said bottom side;

a connecting assembly partially disposed in said filter bag, said connecting assembly having an outlet pipe with an outlet in fluid communication with the fuel tank fuel suction inlet and a connecting pipe coupled to said outlet pipe and having an opening disposed in said filter bag that is in fluid communication with said outlet of said outlet pipe and an inverted trough-shaped member extending from said connecting pipe into said filter bag, said inverted trough-shaped member having an upper wall with a tip end that extends diagonally downwardly over and away from said connecting pipe opening into said filter bag, opposed side walls that extend downwardly from said upper wall, and a pair of curved tabs, each said curved tab attached to a separate one of said side walls adjacent said tip end of said upper wall and being shaped to extend below said side wall to which said tab is attached; and a frame connected to said connecting assembly and disposed in said filter bag, said frame including: an elongated bottom plate attached at one end of said connecting assembly below said opening formed in said connecting pipe and below said inverted trough-shaped member, said bottom plate having two bottom plate portions that are spaced apart from each other so as to define an elongated center opening therebetween; and a plurality of rib plates that extend upwardly between said spaced apart bottom plate portions, each said rib plate being connected to both said bottom plate portions of said frame and extending across said center opening of said bottom plate and being shaped to define a notch that extends upwardly from said center opening of said bottom plate.

23. The fuel filter of claim 22, wherein said bottom plate is formed so that said bottom plate portions are spaced apart from each other adjacent said connecting pipe so as to define an opening in said bottom plate below said inverted trough-shaped member.

24. A fuel filter for use in a vehicle fuel tank, the vehicle fuel tank having a fuel suction inlet therein, said fuel filter including:

a filter bag formed from a filter mesh material, said filter bag having a top side and a bottom side opposed to said bottom side;

a connecting assembly partially disposed in said filter bag, said connecting assembly having an outlet pipe with an outlet in fluid communication with the fuel tank fuel suction inlet and a connecting pipe coupled to said outlet pipe and having an opening disposed in said filter bag that is in fluid communication with said outlet of said outlet pipe; and a frame connected to said connecting assembly and disposed in said filter bag, said frame including: an elongated bottom plate attached to said connecting assembly and having a forward end spaced from said connecting pipe, said bottom plate having two bottom plate portions that are spaced apart from each other so as to define an elongated center opening that extends from said forward end of said bottom plate to said connecting assembly; and a plurality of rib plates that extend upwardly between said spaced apart bottom plate portions and that are located between said forward end of said bottom plate and said connecting assembly, each said rib plate being connected to both said bottom plate portions of said frame and extending across said center opening of said bottom plate and being shaped to define a notch that extends upwardly from said center opening of said bottom plate and to have an upper edge that is convexly curved relative to said bottom plate portions, whereby said notches formed in said rib plates allow fluid communication through said rib plates.

25. The fuel filter of claim 24, wherein said rib plates are further shaped to have widths along the center sections thereof that are greater than the widths of the portions of said rib plates attached to said bottom plate portions and to have side edges formed with curved profiles.

* * * * *

UNITED STATES PATENT AND TRADEMARK OFFICE
CERTIFICATE OF CORRECTION

PATENT NO. : 5,639,367
DATED : June 17, 1997
INVENTOR(S) : Toshihide Ohzeki et al It is certified that error appears in the above-indentified patent and that said Letters Patent is hereby corrected as shown below:

Column 8, line 36; change "welding" to ---welded---.

Signed and Sealed this

Ninth Day of December, 1997

Attest:

BRUCE LEHMAN

Attesting Officer

Commissioner of Patents and Trademarks